United States Patent [19]

Ikejima et al.

[11] Patent Number: 4,832,159

[45] Date of Patent: May 23, 1989

[54] ELEVATOR CONTROL APPARATUS

[75] Inventors: Satomi Ikejima; Shigemi Iwata, both of Inazawa, Japan

[73] Assignee: Mitsubishi Denki Kabushiki Kaisha, Japan

[21] Appl. No.: 216,305

[22] Filed: Jul. 8, 1988

[30] Foreign Application Priority Data

Jul. 9, 1987 [JP]  Japan .................................. 62-171465

[51] Int. Cl.$^4$ ................................................ B66B 3/02
[52] U.S. Cl. ...................................... 187/129; 187/134
[58] Field of Search ........................ 197/117, 129, 134

[56] References Cited

U.S. PATENT DOCUMENTS

| | | | |
|---|---|---|---|
| 4,134,476 | 1/1979 | Zolnerovich, Jr. et al. | 187/134 |
| 4,367,811 | 1/1983 | Yoneda et al. | 187/129 |
| 4,671,391 | 6/1987 | Sasao | 187/134 |
| 4,691,807 | 9/1987 | Iwata | 187/117 |
| 4,716,517 | 12/1987 | Iwata | 364/148 |
| 4,735,295 | 4/1988 | Hochstrasser et al. | 187/134 |
| 4,754,851 | 7/1988 | Suzuki | 187/129 |

Primary Examiner—William M. Shoop, Jr.
Assistant Examiner—W. E. Duncanson, Jr.
Attorney, Agent, or Firm—Leydig, Voit & Mayer

[57] ABSTRACT

An elevator control apparatus in which a stop position command signal for floor arrival at each floor is generated irrespective of the position of a plate; comprising cage position-calculation means for calculating the current position of a cage on the basis of the movement value of the cage, floor height value-memory means for storing the floor heights of respective floors, stop position command signal-calculation means for calculating the stop position command signal for each floor on the basis of the current position of the cage and the height value, and memory write/read means for adjusting the error of the stop position command signal ascribable to the deviation of the plate by rewriting offset data defined in correspondence with each floor.

3 Claims, 5 Drawing Sheets

FIG. 4

```
     1UL POS PT              1DL POS PT
   ┌───────────┐           ┌───────────┐
 1 │ FLUH (1)  │         1 │ FLUH (1)  │
   │    .      │           │    .      │
   │    .      │           │    .      │
   │    .      │           │    .      │
 K │ FLUH (K)  │         K │ FLUH (K)  │
   │    .      │           │    .      │
   │    .      │           │    .      │
   │    .      │           │    .      │
N-1│FLUH (N-1) │       N-1 │FLDH (N-1) │
 N │ FLUH (N)  │         N │ FLDH (N)  │
   └───────────┘           └───────────┘
```

FIG. 5

```
       OFFSET DATA
     ┌───────────┐
   1 │ OFSD (1)  │
     │    .      │
     │    .      │
     │    .      │
   K │ OFSD (K)  │
     │    .      │
     │    .      │
     │    .      │
 N-1 │OFSD (N-1) │
   N │ OFSD (N)  │
     └───────────┘
```

4,832,159

ELEVATOR CONTROL APPARATUS

BACKGROUND OF THE INVENTION

This invention relates to an elevator control apparatus, and more particularly to an elevator control apparatus in which a stop position command signal required for the floor arrival of an elevator cage can be generated accurately and conveniently.

In a case where, in an elevator which operates among a plurality of floors, a cage is caused to accurately arrive at the respective floors, the start point of a floor arrival sequence and the operating point of a brake are important factors. It is a stop position command signal that determines such floor arrival sequence-start point and brake operation point. The command signals are generated by plates which are disposed in a hoistway in correspondence with the respective floors, and a position detector which is mounted on the cage.

FIG. 7 shows the whole construction of the elevator which is furnished with the stop position command signal-generation means as stated above. Referring to the figure, numeral 11 designates the cage of the elevator, numeral 12 is a counterweight, and numeral 13 a rope which is wound round a sheave 14. The cage 11 and the counterweight 12 are respectively coupled to both the suspending ends of the rope 13. An electric motor 15 drives the sheave 14, a pulse generator 16 generates pulses proportional to the movement distance of the cage 11 on the basis of the revolutions of the motor 15, a counter circuit 17 counts the pulses from the pulse generator 16, and electronic computer 18 receives a movement distance signal 17a from the counter circuit 17 and executes predetermined operations for an elevator running control. Numeral 19 indicates a floor, and numeral 20 a plate, such plates being disposed in a hoistway in correspondence with respective floors. Shown at numeral 21 is a position detector which is mounted on the cage 11, and which transmits an output signal 21a to the electronic computer 18 when the cage 11 has arrived at the level position of each floor.

FIG. 8 is a view showing the operating state of the position detector 21. As seen from this figure, the position detector 21 operates when the cage 11 exists between a short run of 15 mm and an overrun of 175 mm with respect to the floor surface level 19a of each floor 19. In addition, the position detector 21 has operation points for each of UP (ascent) and DOWN (descent) at each floor and delivers the stop position command signal for floor arrival when the cage has come to the corresponding operation point.

In the elevator control apparatus of the above construction, the cage 11 begins to be decelerated when it travels in response to the hall call of a waiting person or a cage call of a passenger and approaches a fixed distance short of a destination floor. Subsequently, the position detector 21 enters the region capable of sensing the plate 20, and output a signal 21a, namely, the stop position command signal is received by the electronic computer 18, whereby this electronic computer decides that the cage 11 has arrived at a point 15 mm short of the destination floor. Then, the electronic computer 18 operates a brake (not shown) assembled in a transmission system for the motor 15 and the sheave 14, and it also starts a floor arrival sequence so as to cause the cage 11 to arrive at the destination floor.

In the prior-art elevator control apparatus as stated above, the generation timing of the stop position command signal when the cage 11 is at a point 15 mm short of the destination floor for determining the start point of the floor arrival sequence as well as the operating point of the brake is determined by the plate 20 which is mounted in the hoistway in correspondence with the pertinent floor. Therefore, the mounting error of the plate 20 directly affects the accuracy of the floor arrival.

Accordingly, at the times of the installation and maintenance of the elevator, the plates 20 of the respective floors must have their positions adjusted exactly in order to enhance the accuracy of the stop position command signals. This has led to the problems that a very long time is expended on the adjustments, and that high degrees of techniques and skill are required therefor.

SUMMARY OF THE INVENTION

This invention has been made in order to solve the problems as mentioned above, and consists in that a stop position command signal for floor arrival at each floor is generated without regard to the position of a plate. Thus, the position adjustments of the plate become unnecessary, and high degrees of techniques and skill are dispensed with.

An elevator control apparatus according to this invention comprises cage position-calculation means for calculating the current position of a cage of the basis of the movement value of the cage, floor height value-memory means for storing the floor heights of respective floors, stop position command signal-calculation means for calculating a stop position command signal for each floor on the basis of the current position of the cage and the height value, and memory write/read means for adjusting the error of the stop position command signal ascribable to the deviation of a plate by rewriting offset data defined in correspondence with each floor.

In this invention, the stop position command signal-calculation means calculates the stop position command signal for each floor on the basis of the current position information of the cage and the floor height information, so that the stop position command signal is generated irrespective of the position of the plate. The floor height information is stored in advance by detecting the position of the plate. However, even when the position of the plate at the detection involves a deviation, the error of the stop position command signal attributed to the deviation of the plate at this time is corrected by rewriting the offset data by the use of the memory write/read means. Thus, according to this invention, the position adjustments of the plate are dispensed with, and the stop position command signal of high accuracy can be produced at low cost.

BRIEF DESCRIPTION OF THE DRAWINGS

FIG. 4 is a diagram for explaining a floor height value-storing memory in an embodiment of this invention;

FIG. 5 is a diagram for explaining an offset data-storing memory in an embodiment of this invention;

Throughout the drawings, the same symbols indicate identical or equivalent portions.

DETAILED DESCRIPTION OF THE PREFERRED EMBODIMENTS

Now, the embodiments of this invention will described with reference to the drawings.

Figure 1:
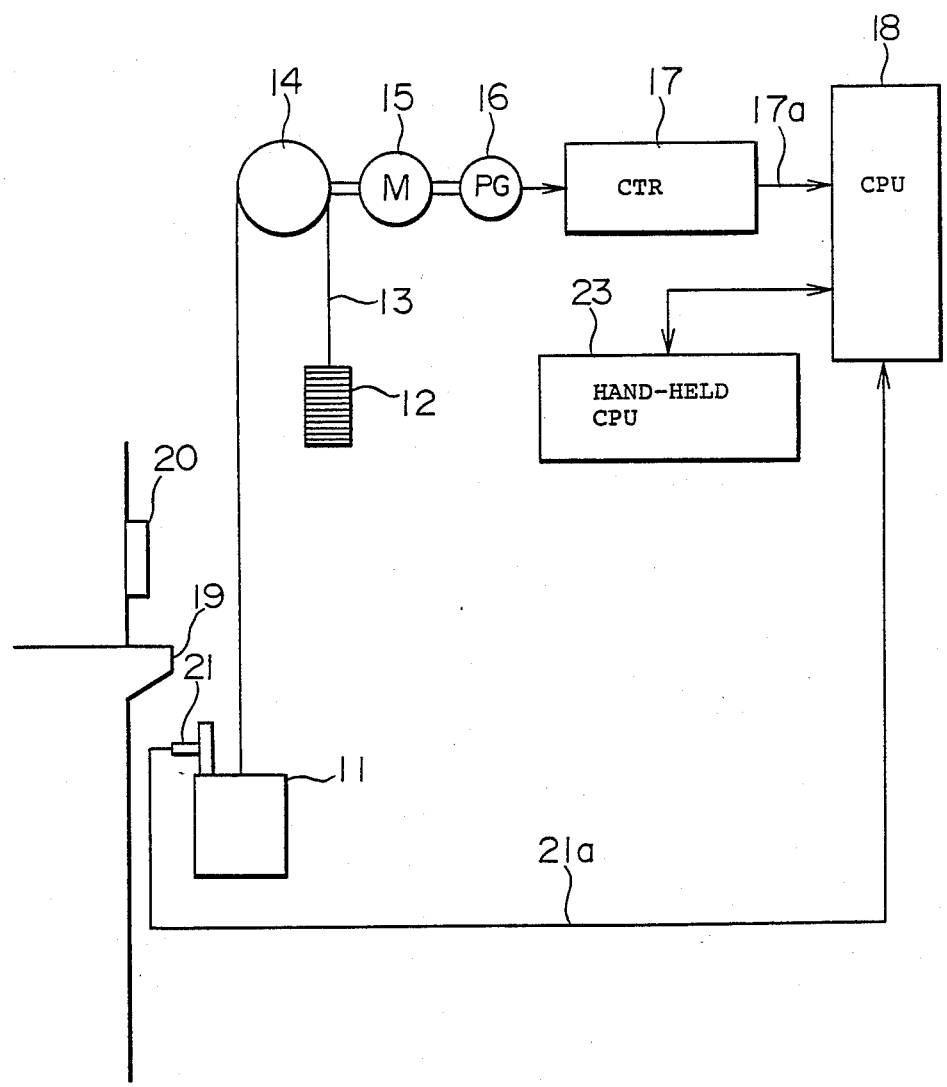
FIG. 1 is a whole constructional view showing an example of an elevator control apparatus according to this invention.
Figure 7:
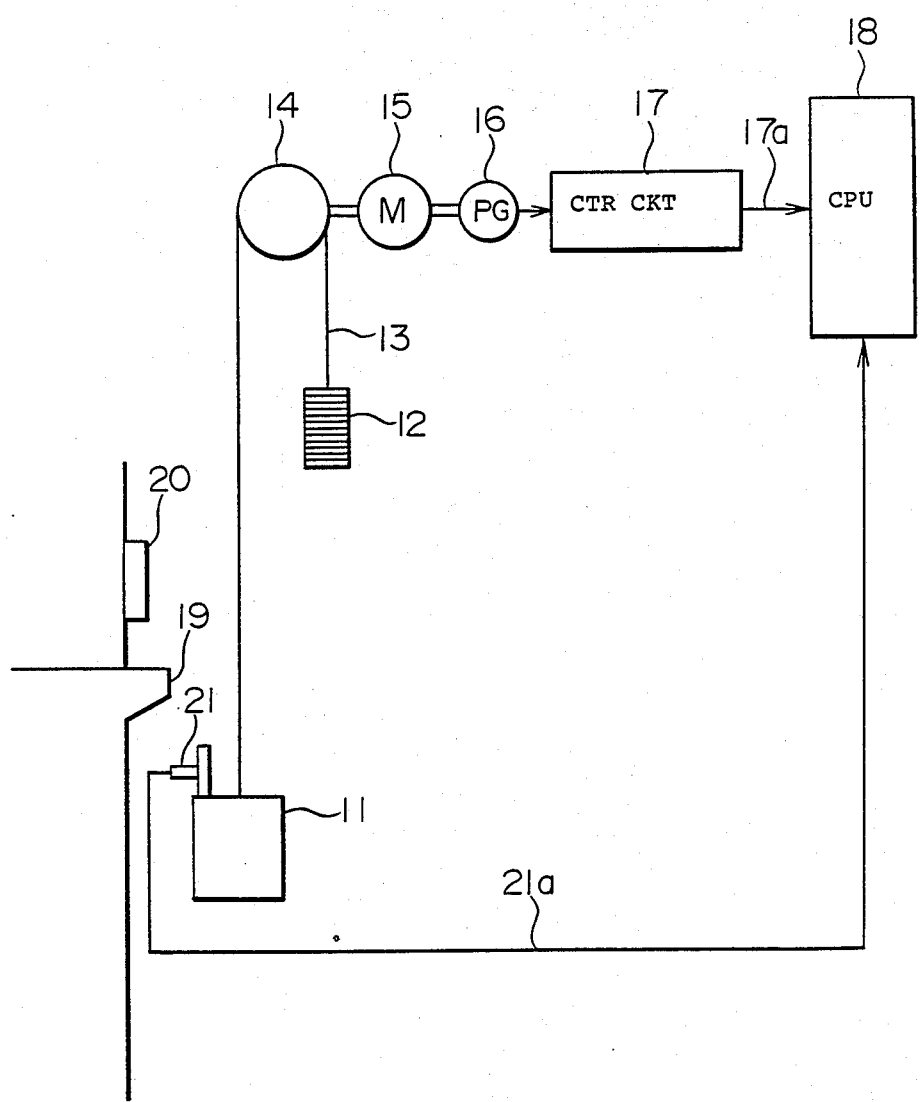
FIG. 7 is a whole constructional view of a prior-art elevator control apparatus.

FIG. 1 is a whole constructional view of an elevator control apparatus to which the control system of this invention is applied. In the figure, the same symbols as in FIG. 7 denote identical portions, the constructions of which shall be omitted from the description. An electronic computer 18 for controlling an elevator has the functions of calculating a cage position on the basis of the movement distance information of a cage 11 from a counter circuit 17 and calculating and storing the floor height information items of respective floors on the basis of output signals 21a from a position detector 21, and also the function of calculating a stop position command signal for floor arrival at each floor on the basis of the cage position information and the floor height information. Further, it has the function of storing offset data for adjusting "15 mm short of floor" signals being the stop position command signals in accordance with the positions of plates 20 at the respective floors.

Besides, the electronic computer 18 has the function of rewriting the information stored in its memory through a hand-held computer 23 which is freely attached to and detached from a control panel, (not shown) including the electronic computer 18 therein.

Figure 2:
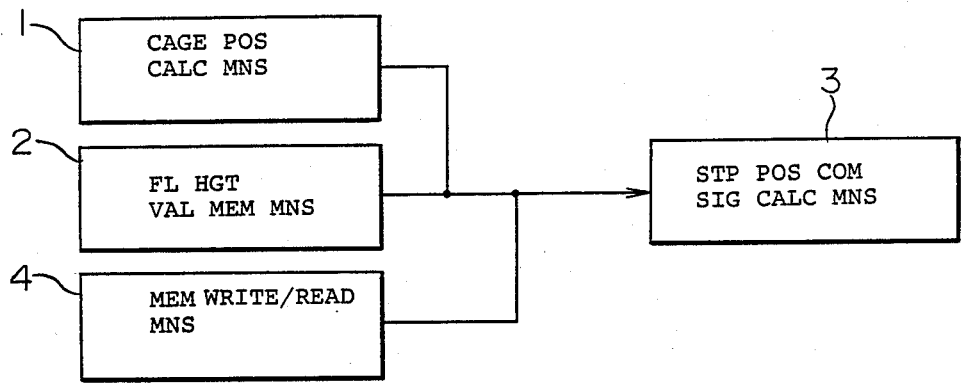
FIG. 2 is a fundamental block diagram of a control system in this invention.

FIG. 2 is a fundamental block diagram of this invention showing the functions of the electronic computer 18 in the form of blocks. Referring to the figure, numeral 1 designates cage position-calculation means for calculating the current position of the cage 11 from the movement distance data thereof every calculation period as obtained through a pulse generator 16 and the counter circuit 17 on the basis of the revolutions of an electric motor 15.

Figure 3:
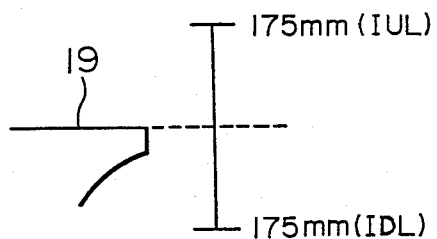
FIG. 3 is a diagram showing the plate operation points of each floor in an embodiment of this invention.

Numeral 2 designates memory means for storing the floor height values of the respective floors. In case of storing the floor height value in the memory means 2, the passage of the cage 11 by the plate 20 is detected by the position detector 21, and the current position of the cage 11 at that time is stored as the floor height value. Regarding the operating points of the position detector 21 at each floor on this occasion, a point lying 175 mm above the floor and a point lying 175 mm below the floor are respectively stored in the memory as a position IUL and a position IDL with respect to the floor surface level of each floor as illustrated in FIG. 3.

FIG. 4 shows the contents of the floor height memory portion, and it exemplifies the floor height values of the IUL positions and IDL positions of the respective floors in a building in which the cage stops at N floors. The floor height value of the IUL position of the lowermost floor is given by FLUH(1), that of the IUL position of the K-th floor by FLUH(K), and that of the IUL position of the uppermost floor by FLUH(N). On the other hand, the floor height value of the IDL position of the lowermost floor is given by FLDH(1), that of the IDL position of the K-th floor by FLDH(K), and that of the IDL position of the uppermost floor by FLDH(N).

Referring back to FIG. 2, numeral 3 indicates means for calculating the stop position command signal for floor arrival. It calculatively decides the arrival of the cage 11 at the floor on the basis of the current position information of the cage 11 from the cage position-calculation means 1 and the floor height value stored in the floor height value-memory means 2, whereupon it generates the stop position command signal.

Numeral 4 indicates memory write/read means for altering the difference between a prescribed distance of 15 mm short of the floor and an actual "15 mm short of floor" signal obtained by detecting the position of the plate 20, namely, offset data in accordance with the mounting error of the plate 20. Thus, the stop position command signal corresponding to the prescribed distance of 15 mm short of the floor is produced with the offset data without adjusting the position of the plate 20. This means is implemented by the hand-held computer 23 in FIG. 1.

The offset data items are stored in a nonvolatile memory, such as $E^2PROM$, which is provided in the electronic computer 18.

FIG. 5 shows the interior of the nonvolatile memory storing the offset data, and it tabulates the offset data items of the respective floors for adjusting the "15 mm short of floor" signals which are the stop position command signals. The offset data of the lowermost floor is given by OFSD(1), that of the K-th floor by OFSD(K), and that of the uppermost floor by OFSD(N).

Figure 6:
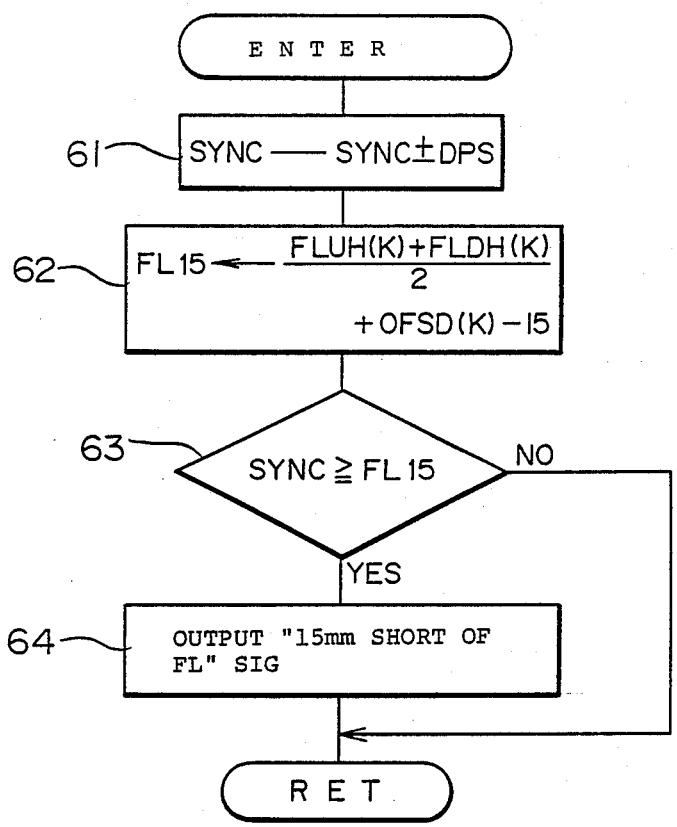
FIG. 6 is a flow chart for calculating a "15 mm short of floor" signal in an embodiment of this invention.
Figure 8:
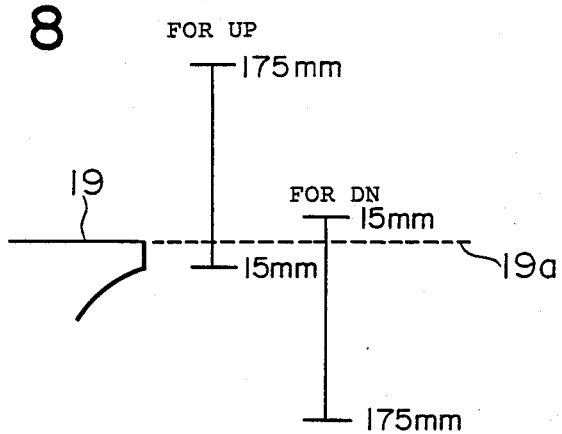
FIG. 8 is a diagram showing the plate operation points of each floor in the prior art.

Next, the operation of the embodiment constructed as described above will be explained with reference to a flow chart in FIG. 6.

Now, there will be elucidated a case where the elevator cage 11 ascends when the floor height values are stored.

It is assumed that the elevator cage 11 travels in the UP direction, and the the K-th floor is a destination floor. First, at a step 61, the movement distance DPS of the cage 11 counted by the counter circuit 17 is added every calculation cycle of the electronic computer 18, thereby to find the current position SYNC of the cage 11. Subsequently, at a step 62, the average value of the floor height value FLUH(K) of the IUL position and the FLDH(K) of the IDL position of the K-th floor is found, and it becomes the level position, namely, floor height value of the K-th floor. Besides, the offset data OFSD(K) of the K-th floor is added to the level position data, and 15 mm is subtracted from the sum. Then, the result becomes data FL15 for the stop position command signal at 15 mm short of the K-th floor.

At the next step 63, the current position SYDN of the cage and the data FL15 are compared, and subject to SYNC $\geq$ FL15, the control flow proceeds to a step 64. Here, the "15 mm short of floor" signal, namely, the stop position command signal is transmitted.

Now, assuming by way of example that the plate 20 of the K-th floor deviates 10 mm below the prescribed position thereof, each of the IUL position and the IDL position becomes a value which is 10 mm smaller than the actual value thereof. At this time, the data FL15 corresponds to a point which is 10 mm below the actual point 15 mm short of the floor. As a result, the "15 mm short of floor" signal is output earlier to the extent of 10 mm.

In such a case, at the time of the installation or maintenance of the elevator, the hand-held computer 23 is connected to the elevator control panel through an interface (not shown). Subsequently, the content of the offset data OFSD(K) of the K-th floor being unusally "0" is rewritten to become "10" by the hand-held computer 23. Thus, the data FL15 comes to express the point lying 15 mm short of the level position, and the deviation of the plate 20 of the K-th floor poses no problem.

Although, in the above, the downward deviation of the plate of the K-th floor has been referred to, the content of the offset date OFSD(K) may be similarly rewritten to the extent of a deviation even when the plate deviates upwards. In this case, however, a minus number is used.

Next, there will be explained an adjusting method in the case of actually adjusting the "15 mm short of floor" signal.

First, in the state in which the load of the cage 11 and a counterweight 12 are balanced, the cage is caused to travel up and down to the respective floors, and floor arrival positions on this occasion are examined.

It is now assumed that the floor arrival of the cage at the L-th floor ($1 \leq L \leq N$) involves an overrun of 5 mm relative to the level position of this floor in the up travel operation and a short run of 5 mm relative to the same in the down travel operation.

This indicates that the "15 mm short of floor" signal is output 5 mm later in the up operation and 5 mm earlier in the down operation with respect to the actual point of lying 15 mm short of the floor. It is accordingly considered that the plate 20 deviates 5 mm upwards.

Therefore, the offset date OFSD(L) of the L-th floor is rewritten into "−5" by the hand-held computer 23. Thereafter, the floor arrival positions on this occasion are verified, whereby the accuracy of the floor arrival is enhanced.

In this way, the deviations of the plates at the respective floors are adjusted with the offset data items corresponding thereto, whereby the "15 mm short of floor" signals, namely, the stop position command signals at high accuracy can be obtained.

In the normal operation, the stop position command signals are generated on the basis of the floor height value information thus adjusted, so that the cage reaches the floors at precise positions irrespective of the positions of the plates or the presence or absence of the plates.

Although, in the foregoing embodiment, the offset data items have been stored in the nonvolatile memory. However, they can be similarly stored by combining a volatile memory (RAM) and batteries, or a RAM and capacitors.

Besides, the embodiment has been described as to the case where the stop position command signal is variable. However, the technique is also applicable to the switching signal of another position point for detecting the position of a hoistway, for example, the position signal of a deceleration position point at which deceleration begins from rated speed, a cage position correction point at which the current position of the cage is corrected, or a terminal floor position point which expresses a terminal floor for stopping the cage without fail.

As described above, according to this invention, a stop position command signal for each floor is calculated using a floor height value stored beforehand and the current position of a cage, and in storing the floor height value, the floor height value is determined by the position of a plate, and the error of the stop position command signal attributed to the deviation of the plate on this occasion is corrected by rewriting offset data. Therefore, the invention brings forth the effects that the accuracy of the "15 mm short of floor" signal can be readily enhanced, and that the position adjustments of the plates are dispensed with, so the adjustment and maintenance costs thereof can be saved.

What is claimed is:

1. An elevator control apparatus comprising an elevator cage which travels among a plurality of floors, cage position-calculation means for calculating a current position of said cage on the basis of a movement value of said cage, plates which are disposed in correspondence with the respective floors in a hoistway where said cage ascends and descends, floor height value-memory means for storing positions of said plates as floor height values, memory write/read means for storing error values between actual mounting positions of said plates and preset mounting positions, and stop position command signal-calculation means for correcting the floor height values stored in said floor height value-memory means, on the basis of the error values stored in said memory/read means, and calculating stop positions of said cage at the respective floors.

2. An elevator control apparatus according to claim 1, wherein said cage position-calculation means calculates the cage movement value from movement distance data of said cage every calculation cycle as obtained through a pulse generator and a counter circuit on the basis of revolutions of an electric motor for driving said elevator cage.

3. An elevator control apparatus according to claim 1, wherein said floor height value-memory means detects passage of said cage through said plate by the use of a position detector and stores the current position of said cage at that time as the floor height value.

* * * * *